United States Patent [19]
Courtright

[11] 3,848,625
[45] Nov. 19, 1974

[54] PRIME MOVER FOR AND IN WHEEL-LINE IRRIGATION APPARATUS

[75] Inventor: Burr Courtright, LaGrande, Oreg.
[73] Assignee: CH₂O, Inc., LaGrande, Oreg.
[22] Filed: Nov. 7, 1973
[21] Appl. No.: 413,704

[52] U.S. Cl. ............................................. 137/344
[51] Int. Cl. ...................... A01g 25/02, B05b 3/12
[58] Field of Search ............ 137/344; 239/212, 213

[56] References Cited
UNITED STATES PATENTS
3,545,478   12/1970   Etgen .................................. 137/344
3,592,220   7/1971   Reinke ............................... 137/344

*Primary Examiner* — Henry T. Klinksiek

[57] ABSTRACT

A prime mover for and with an agricultural, irrigation, side-roll wheel-line wherein the wheel-line is simultaneously translated across given terrain and is also supplied water under pressure, whereby the sprinklers of the delivery system of the wheel-line are continuously operating during wheel-line movement. The subject prime mover is constructed for connection to a pressure hose, includes a slip joint or water jacket for accommodating the revolving central conduit of the wheel-line, and also employs the water pressure of the water input to drive, via a turbine or other equivalent means, a mechanical drive constructed to revolve the wheel-line proper. Auxiliary power means are provided for moving the prime mover onto a trailer bed or to a selected initial position on a field to be irrigated. A capstan, with an elongate connector or cable wrapped thereon, facilitates both the guiding of the prime mover as well as actually aiding in its translational movement. A wheel-line deflection sensor structure senses predetermined excessive deflection in the wheel line so as to provide for an automatic shut-off of the latter from the central conduit of the wheel line. Other advantages are apparent from the disclosure herein.

12 Claims, 18 Drawing Figures

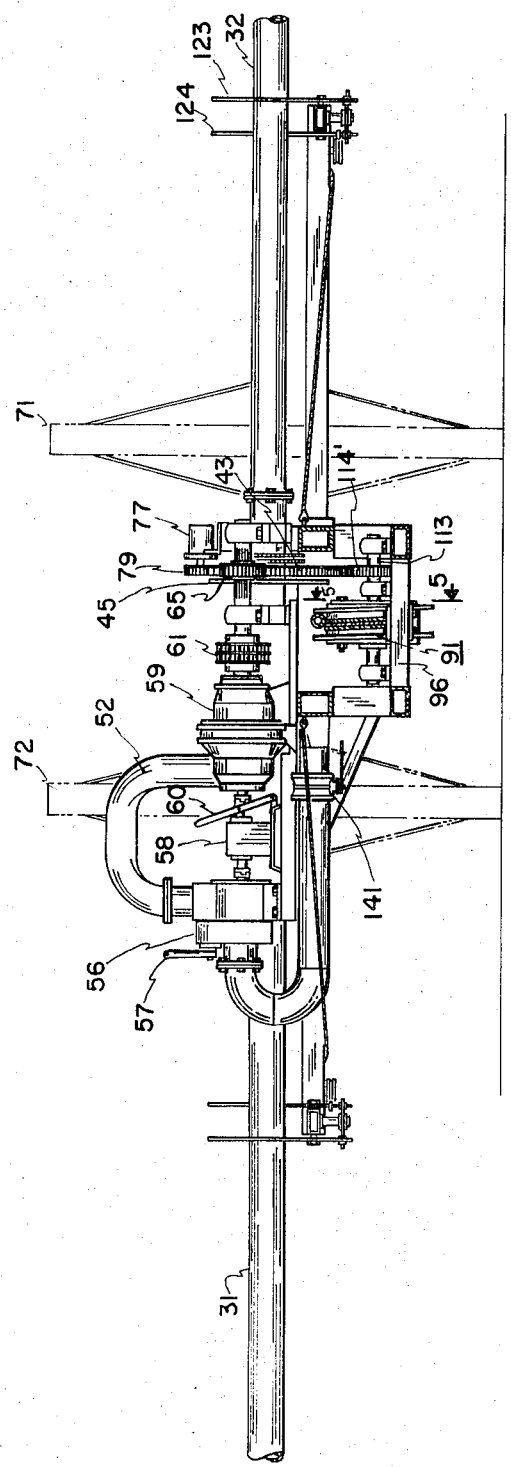
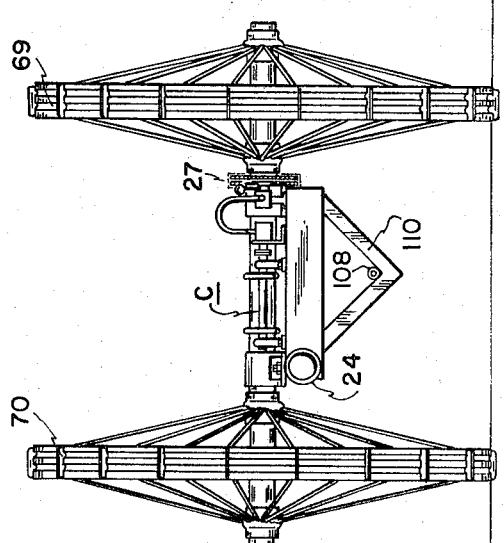

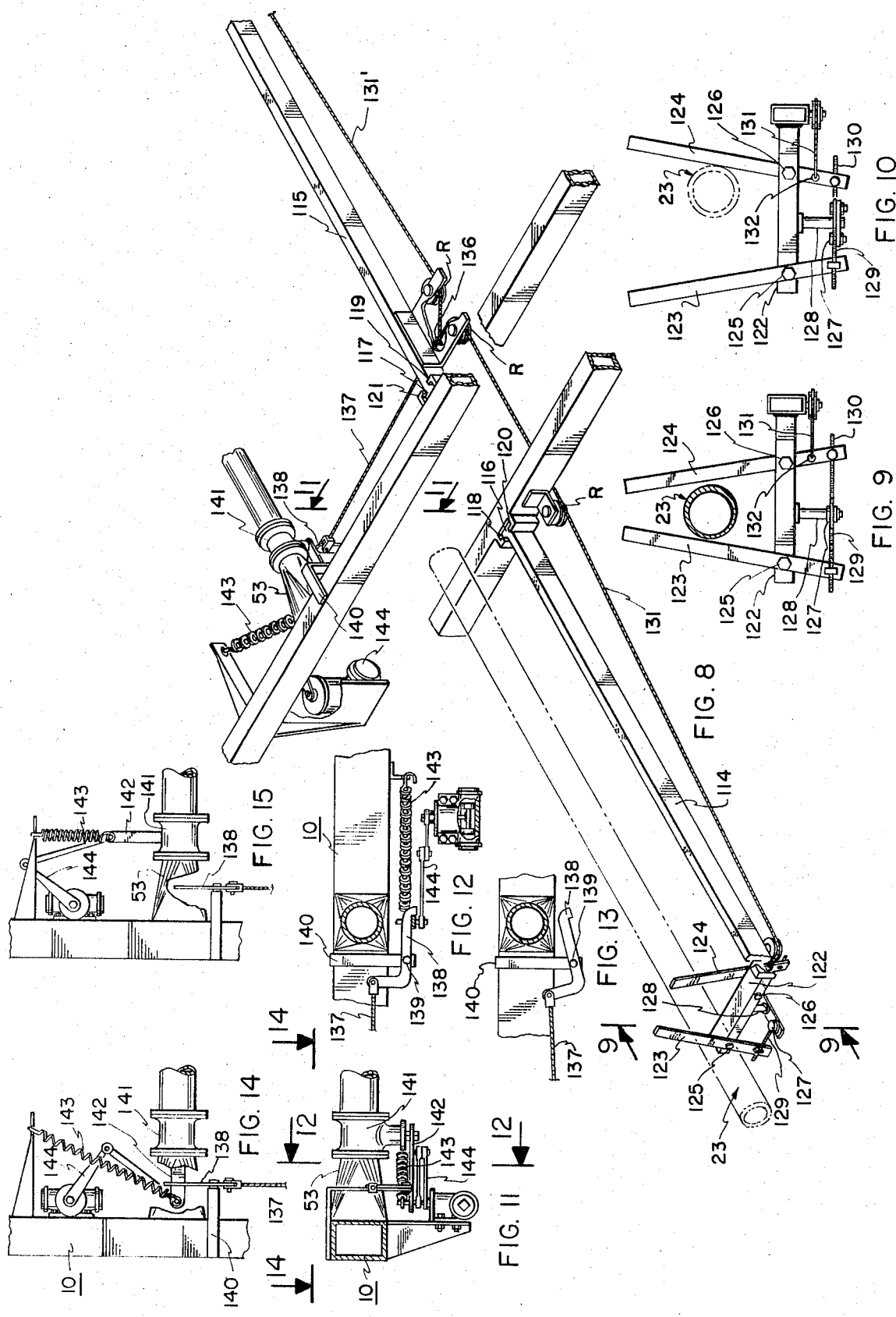

PRIME MOVER FOR AND IN WHEEL-LINE IRRIGATION APPARATUS

The present invention relates to agricultural wheel-lines designed for use in irrigating a field, and, more particularly, to a new and improved prime mover for and with a wheel-line such that the wheel-line can be operated for irrigation purposes while the line itself is moving across a field.

Wheel-lines per se are common in the agricultural irrigation art. These will include an elongate central conduit, made up of joined coaxial conduit portions and extending perhaps one quarter of a mile or more. This central conduit is supported by mutually spaced wheels that are generally keyed to such central conduit. Water delivery means are provided intermediate the wheels so that irrigation sprinklers may be operative to irrigate the field in a relatively continuous pattern.

The conventional approach has been to employ a standard prime mover, such as a tractor, for locating the wheel-line at one position in a field, then applying water pressure to irrigate that strip of the field proximate the wheel-line, then draining the wheel-line, and, finally, providing the same tractor for moving the wheel-line to a new, adjacent position for further sprinkling. Thus, the irrigation process is one of intermittent steps that are laborious and time-consuming.

The central feature of the present invention is that the prime mover employed operates by water pressure to advance progressively the wheel-line over a given field while at the same time operating to deliver pressured water to the wheel-line water delivery system for simultaneous irrigation. Thus, the intermittent, stop periods and requisite draining are avoided. Furthermore, the water under pressure serves to "stretch" the line so that there is less likelihood of sagging or distortion-set in the wheel-line conduit. The total effect of the subject prime mover and wheel-line is to provide continuous irrigation of the field as the wheel-line progressively moves over that field. This results in a most advantageous irrigation pattern.

The system self-operates from one base point to a given remote point for advancement in the field. Hence, no labor is required to advance the prime mover over the field or to drain the line intermittently as has been required in the case of prior structures.

In the present invention the prime mover comprises a frame having a series of journaled wheels. A slip joint, water jacket structure is appropriately sealed to the central conduit structure of the wheel-line and thereby enables such conduit structure to revolve within its journals as the wheel-line is being advanced.

An external hose carrying pressured water is selectively connected to either end of the vehicle so that the same is dragged along the field as the prime mover advances in the then forward direction. Means converting water pressure flow to axial shaft revolvement are employed for suitable transmission and other means so that the water supply itself revolves the central conduit of the wheel-line by appropriate gearing means. Gear reduction means are used as well as suitable speed control means so that the speed of revolvement of the wheels and, hence, of the prime mover across a given field can be controlled. Outrigger arms are used to sense any excessive deflection in the central wheel-line conduit and, when such excessive deflection does occur, the arms with their associated structures are operative to turn off, automatically, the water supply relative to such central conduit, thereby precluding damage to the equipment.

A capstan and cable system are employed so that the unit is guided across the field to a given point and, additionally, to supply further translational power to the unit. The capstan is designed for decoupling relative to the unit gearing, and clutch means are provided generally between the turbine drive and the main gear keyed to the central conduit of the wheel-line. Auxiliary power means are provided so that the unit can be transported even in the absence of input water pressure.

Additional straunctural advantages will be apparent by reference to the detailed description given hereinbelow.

Accordingly, a principal object of the present invention is to provide a new and improved wheel-line, including novel prime mover, which is constructed to be water-powered for both translation and also water delivery.

An additional object is to provide a new and improved prime mover for wheel-lines.

A further object is to provide a water-propelled wheel-line which is useful for delivering irrigation water while the wheel-line is moving.

An additional object is to provide a prime mover in and for wheel-lines which will optimize irrigation patterns.

A further object is to provide a prime mover in and for wheel-lines wherein excessive deflection from a given transverse direction of the wheel-line will be operative to shut off water supply to the wheel line.

A further object is to provide a capstan and cable combination in a wheel-line prime mover, this to aid in both the directional travel of the prime mover as well as supplying additional power to the wheels of such prime mover.

An additional object is to provide a water-powered prime mover for wheel-lines wherein the same includes auxiliary power means so as to enable transport of the prime mover even when water pressure is not applied.

The features of the present invention may best be understood by reference to the accompanying drawings and description in which:

FIG. 1A is an enlarged fragmentary detail taken on the arcuate line 1A—1A in FIG. 1.

FIG. 3 is a transverse vertical section taken on the line 3—3 of FIG. 1.

FIG. 4 is a representative end view of the structure of FIG. 1.

FIG. 5 is an enlarged side elevation of the capstan and cable structure shown at the central bottom portion of FIG. 2.

FIG. 6 is a top plan of the structure of FIG. 5.

FIG. 7 is a partially sectioned, right end view of the structure of FIG. 5.

FIG. 8 is an enlarged fragmentary perspective view of the frame structure of the prime mover and shows specifically the outrigger arms and excessive-deflection, sensing structure serving to shut off the input water supply to the central conduit of the wheel-line.

FIG. 9 is an enlarged elevation taken along the line 9—9 in FIG. 8 and concerns the structure circled by the arcuate line 9 in FIG. 1; in FIG. 9, the outwardly extending wheel-line conduit is disposed centrally in its normal condition between the two sensing levers indicated.

FIG. 10 is a view similar to FIG. 9 but illustrates the central conduit as having been advanced sufficiently to engage and move the righthand lever of the sensing structure, whereby to actuate apparatus that operates to turn off the water supply to the central conduit of the wheel-line.

FIG. 11 is a section view taken along the line 11—11 in FIG. 9, and illustrates the structure associated with the butterfly shut-off valve used.

FIG. 12 is a section view taken along the line 12—12 of FIG. 11, this showing the latch engaged so as to retain the butterfly valve in an open condition.

FIG. 13 is similar to FIG. 12 but illustrates that, with the deflection of the central conduit as shown in FIG. 10, the latch is lifted upwardly so as to release the closure mechanism associated with the butterfly shut-off valve.

FIG. 14 is a top plan of the structure of FIG. 12 and is similar to FIG. 12, indicating the latching by the latch of the control handle of the valve.

FIG. 15 indicates that with a pulling of the subject cable, owing to an excessive deflection condition existing, the latch raises upwardly so as to release the control arm of the butterfly valve which, under the spring pressure applied, operates to close the valve.

Figure 1:
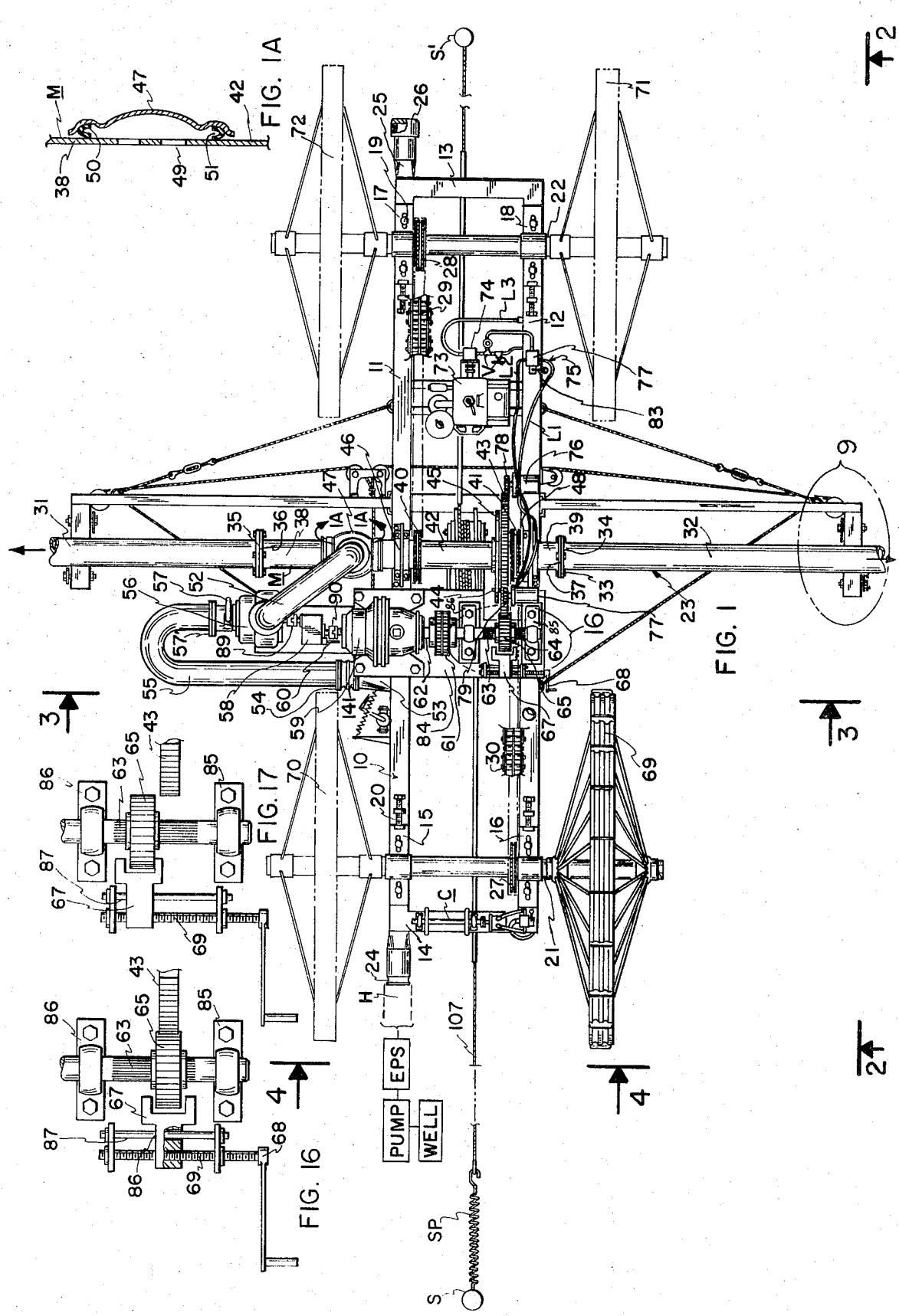
FIG. 1 is a top plan of a prime mover, with wheel lines shown in fragmentary view, all constructed in accordance with the principles of the present invention; the same presents a preferred embodiment thereof.

FIG. 16 is an enlarged detail taken along the arcuate line 16 in FIG. 1, showing the gears of the clutch engaged.

FIG. 17 is similar to FIG. 16, but showing the gears disengaged.

In FIG. 1 the frame 10 includes a pair of elongate, longitudinally oriented, mutually spaced members 11 and 12 provided at their respective opposite ends with cross members 13 and 14. Each of the members 11 and 12 includes adjustable pillow-block bearings 15 and 16, at a rearward position, and 17 and 18 at a forward position, respectively. Attachment bolts 19 are provided for each of the bearings, together with adjustment bolts 20, so that the journaled axles 21 and 22 may be appropriately mutually spaced apart. These axles are shown as journaled in the respective aligned bearings as seen in FIG. 1.

Mounted atop the elongate members 11 and 12 is linear, wheel-line central conduit means 23 the details of which will be described hereinafter. At this point it is preferred to explain that elongate member 11, for example, may be hollow and thereby be communicative with inlet ports 24 and 25, one of which (25 in FIG. 1) is selectively capped by cap means 26. Either of the inlet ports is constructed for securement to a pressured agricultural hose H that has the usual clamping means, not shown. Thus, where the unit of FIG. 1 progresses in a direction to the right of the viewer, then the hose will be coupled to the inlet port 24. Should the unit be desired to progress in a reverse direction, then the cap 26 will be removed and re-installed at inlet port 24, whereas the agricultural hose H now will be connected to inlet port 25.

Sprocket wheels 27 and 28 are respectively keyed to axles 21 and 22, and double sprocket chains 29 and 30 are disposed thereabout as indicated.

Wheel-line conduit means 23 includes outer circuit extensions 31 and 32 which are connected by bolt means 33 at their respective flanges 34 and 35 to flange 36 and 37 of integral conduit portions 38, 39 and 42, compositely forming member M. Double sprocket wheels 40 and 41 are keyed to conduit member M and receive sprocket chains 29 and 30. Pinned or otehrwise secured to conduit portion 39 is a main gear 43. This may be facilitated by pin means 44 proceeding through a keyed disc 45 to a corresponding aperture, not shown, in the main gear 43. Conduit portion 42 is journaled by bearing means 46 to elongate member 11 and couples into a T-type water jacket or sleeve 47. The entire member M is journaled by bearing means 38 which is mounted upon elongate member 12.

Where portions 38 and 42 are integral as explained, then the same structure may include wall apertures 39 and seals 50 and 51 proximate the area of jacket or sleeve 47; thus conduit structure 23 turns within sleeve 47, and yet communication of pressured water is provided from U-shaped conduit 52 into the interior of the sleeve 47 to conduit 23.

Elongate member 11 includes a fluid coupling transition section 53 and butterfly valve 141, coupled thereto and provided with collar or other attachment means 54, enabling the coupling of butterfly valve 141 to horizontal J-shaped conduit 55. A variable torque turbine or fluid motor 56, such as a Berkley bypass controlled turbine, manufactured by the Berkley Corp. of Calif., is coupled by bolts or other means to the flange 57 of conduit 55. This turbine, or variable speed fluid motor, is well known in the art and includes output drive 89 and also its own handle means 57 which controls that portion of the water supply which is shunted across the turbine, this so that the speed of the conventional interior rotor of the fluid motor may be controlled.

A conventional shiftable transmission 58 is mechanically interposed between the fluid motor 56 and cyclo-drive unit 59, the latter simply being a conventional gear reducer. Transmission 58 may comprise simply a transmission of any one of several forms having a gear shift mechanism 60. A positive drive, two-sprocket chain-coupling unit 61 may be interposed between the output shaft 62 of unit 59 and splined shaft 63. The latter is splined at 64 to accommodate the shiftable spur gear 65 which meshes with main gear 43. A yoke 67 is threaded to and rides upon the threaded crank 68 and is movable laterally so as to draw the gear 65 into and out of engagement with gear 43. The unit is thus a four-wheel drive unit having wheels 69-72 keyed to the respective axles 21 and 22.

As an auxiliary power supply an engine such as a gasoline engine 73 may be provided which drives hydraulic pump 74. The latter includes conventional hydraulic system 75 driving orbital fluid motors 76 and 77. These fluid motors include respective orbital gears 78 and 79 which mesh with and also drive main gear 43.

Representative orbital motor drive is disclosed in the inventor's copending application entitled "Hose Reel Construction," Ser. No. 290,099, filed Sept. 18, 1972, and incorporated herein by reference. Suffice it to say that alternate pressure and return lines L1 and L2 are connected to two-way valve selector 77, with one line (L1) serving as a pressure line for gear revolvement in one direction, and the remaining line (L2) this time serving as a return flow line. Line L3 may be used to drive an external winch system C, as desired. Shut-off valves V may be provided. Valve 77 includes selector handle 83 to effect pressure switching capability.

Plate 84 is secured to the frame 10 and includes bearings 85 and 86 for journaling the splined shaft 63. This mechanism in combination with crank 68 and bracket by number 16 in FIG. 1 is illustrated in FIG. 16.

The threaded shaft on the latter at 69 threadedly receives and carries yoke 67. The latter may be apertured at 86 for receiving a stationary carrier shaft 87. FIG. 16 illustrates the gear 65 as being in engagement with gear 43, whereas in FIG. 17 the yoke 67 has been advanced so as to draw gear 65 out of engagement with gear 43.

In assembly the sprocket chains 29 and 30 are implaced and the axles are urged outwardly in opposite directions so as to tighten the chains. This is accomplished by the several adjustment bolts 20, see FIG. 1.

The agricultural hose is attached to port 24 in FIG. 1, and frame conduit 11 is hollow such that water can advance through transition section 53 into conduit 55. Thus, this water under pressure drives the turbine 56 so as to provide a mechanical drive proximate transmission 58. While an inter-drive torque limiter may or may not be included between meshed couplers 89 and 90, it is seen that such a torque limiting device such as transmission 58 can be employed. The designs of other mechanical torque limiters such as adjustable disc clutches are conventional in the art.

In any event, the speed of the mechanical drive may be adjusted both by transmission lever 60 and also by the actuation of bypass valve lever 57. The end result is the driving of shaft 63 and in turn gear 65. In the condition shown in FIG. 1, gear 65 meshes with gear 43 so as to revolve the latter gear and also the wheel-line central conduit structure 23 with which that gear is associated. It is noted that conduit 52 couples all of the output water from the turbine 56 into the central wheel-line conduit structure 23 so that water will proceed in the direction of the arrow shown in FIG. 1.

The transmission 58 may be of the reversing type such that lever 60 can be used to drive the unit in multiple-speeds forward or reverse. The direction of movement as well as speed thus may be controlled by lever 60.

Figure 2:
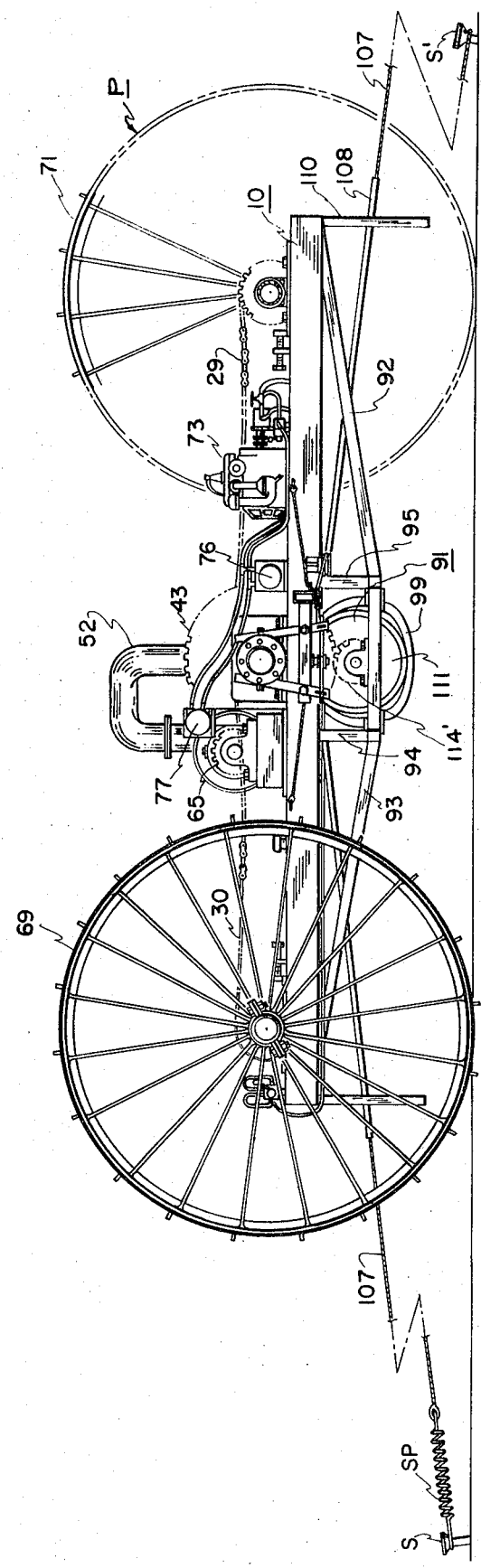
FIG. 2 is a side elevation of the structure shown in FIG. 1.

Mounted underneath the unit is a capstan unit 91. Frame 10 includes braces 92 and 93 on opposite sides and also upstanding braces 94 and 95. This may all be a welded construction and include transverse braces 96 fore and aft, as indicated in FIG. 3 which are bolted in place. The capstan unit 91 is thus bolted to the position shown in FIG. 2 and, as seen in FIG. 5 and FIG. 6, includes a base structure 97 provided with guide structures 98 and 99. Each of the guide structures includes arcuate members 100 and 101 which are bolted, welded or otherwise secured to plates 102 and 103. These plates are bolted by bolt means 104 to base structure 97. The guides are set at an angle of approximately from 3° to 12° relative to the horizontal axis of the machine so that the turns 106 of cable 107 do not tend to wrap over one another. Guide conduits 108 and 109 are mounted and provided for these opposite extremities of cable 107, and are thus supported by the structures 110 disposed at opposite ends of the frame 10. See FIG. 4. The purpose for the guide is to keep the capstan cable 107 in good order, with the turns T being mutually adjacent but not overlapping.

The capstan itself includes a drum 111 which is pinned by pin P to flange 112. Flange 112 is welded at W to revolving shaft 113. It is this revolving shaft 113, see FIG. 3, which receives pinion gear 114'. and the latter meshes with main gear 43.

Accordingly, the cable 107 serves not only as a guide but also as a means whereby the revolving powered capstan drum is utilized so that the prime mover unit P is actually powered by the capstan in a positive drive action along cable 107. This assists the four-wheel drive structure of FIG. 1.

The central wheel-line conduit structure 23 shown in phantom lines in FIG. 8, may become distorted or simply be out of coaxial alignment when the machine is in use. This can be very dangerous in operating the equipment, and often-times wheel-line junctures are bent or even fractured, which may cause serious damage to the machine. The present invention thus uses a deflection sensor structure including lateral extension arms 114 and 115 which are provided with trapezoidal mounting bases 116 and 117. These are positioned in downwardly angulated slots 118 and 119 of mounting boss structures 120 and 121. Each of the lateral arms 114, 115 includes an outwardly disposed base 122 pivotally mounting sensor levers 123 and 124 at pivot pins 125 and 126. A horizontal lever 127 is centrally mounted by pivot means 128 and includes lever connectors or ties 129 and 130, see FIG. 10. These ties are secured to the levers as indicated in FIG. 10. A cable 131 is secured at anchor point 132 to lever 124. Because of the linkage at lever 127, then, should the wheel-line conduit structure 23 become displaced as, for example, to the right as seen in FIG. 10, i.e., displaced from the normal position shown in FIG. 9, then there will be a pulling force upon cable 131. This pulling force, it will be apparent, will persist whether the rearward or the forward lever 123 and 124 is engaged by the deflecting central conduit 23. A similar structure will exist in connection with outwardly extending arm 115, and corresponding cable 131' will likewise be similarly actuated. The same is tied or secured at 136 to cable 131. Pulleys R are provided as shown. The common cable 137 leading from these two cables is shown in FIG. 14 and secured to a lever-type latch 138 as pivoted by pivot means 139 to the frame structure 140 of frame 10. Butterfly valve 141 is coupled to section 53 and includes a control handle or lever 142. The latter is spring-biased by spring means 143 that is secured to the frame at its rearward extremity. Control 142 also operates via a standard pneumatic or hydraulic dampener arm unit 144 such as a conventional door closer. In operation, then when the central conduit 23 at its extremity portions proximate levers 123 and 124, on either side of the structure, exceed any predetermined extremity of lateral travel thereat, then one of the levers is actuated so as to draw inwardly on cable 131 and actuate the control 142 of butterfly valve 141. This operates to gradually control and hence close this valve to the water shut-off so as not to damage the equipment. Where an excess pressure switch, such as a Delaval switch of the domestic Barksdale Company, then the shutting of butterfly valve 141 will cause line pressure in hose H to rise, actuating switch EPS, serving to shut off the pump, as shown.

In operation of course the guide cable 107 will be disposed between two fixed points such as stakes, tractor equipment, and so forth. These are indicated generally at S and S' of FIG. 2, and a shock relief spring may be provided at SP.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. An agricultural, side-roll wheel-line prime mover, including in combination: a frame; forward and rearward, parallel, mutually spaced axles journaled to said frame; wheels mounted upon each of said axles; transverse, central, water-delivery, wheel-line conduit journaled to said frame for axial revolvement; water inlet structure affixed to said frame; water-pressure-to-mechanical-torque converter means mounted to said frame and having a revolvable output drive, a fluid inlet coupled to said water inlet structure, and a fluid inlet, said wheel-line conduit including wall-aperture passageway means; stationary means in part surrounding and sealing said wheel-line conduit over and at opposite sides of said passageway means and coupled to said fluid outlet for passing fluid from said converter means into said wheel-line conduit, for water-delivery irrigation thereby; revolvable torque-responsive means mounted upon and keyed to said central conduit for imparting revolvement to the latter; and mechanical means coupled to and between said revolvable output drive and said torque responsive means for imparting torque to the latter to thereby revolve the same and said wheel-line conduit.

2. The apparatus of claim 1 wherein at least one of said axles and also said control conduit include respective, aligned annular, torque-effecting means keyed thereto, and endless, elongate connector means looped about and thereby coupling together said torque-effecting means.

3. The apparatus of claim 1 wherein each of said axles includes a sprocket keyed thereto, said central conduit including keyed drive sprocket means, and sprocket chain means intercoupling said axle sprockets with said drive sprocket means.

4. Apparatus according to claim 1 wherein said converter means includes an output-drive-regulating, variable, manually actuatable fluid bypass means for regulating the speed of said output drive.

5. Apparatus according to claim 1 wherein said prime mover includes a revolvable capstan, a guide cable wrapped therearound and having opposite ends constructed for anchoring at mutually spaced points at a field to be irrigated, and gear means intercoupling said capstan with said output drive.

6. Apparatus according to claim 5 wherein said capstan includes a central keyed shaft journaled to said frame, a gear keyed to said capstan shaft and mechanically coupled to said torque responsive means as mounted upon said central conduit.

7. Apparatus according to claim 1 wherein said frame includes cable guide means proximate said capstan for guiding the wrapping of said cable, on said capstan, in a flat coil thereon.

8. Apparatus according to claim 1 wherein, between said output drive of said converter means and said torque responsive means there is interposed a drive line comprising a manually shiftable transmission and speed-reduction gear means serially coupled thereto.

9. Apparatus according to claim 1 wherein at least a portion of said frame is hollow, said port structure communicating with that portion of said frame which is hollow, and selectively capped, opposite port structure also so communicating therewith.

10. An agricultural, irrigation prime mover including, in combination, a frame; wheels journaled to said frame for supporting the same; a water-delivery, wheel-line central conduit journaled to said frame; hose-coupling water inlet port structure constructed to drag a water supply hose coupled thereto; and means coupled to said inlet port structure and admitting and responsive to water-flow therethrough for simultaneously feeding water into said central conduit and also for powering said wheels.

11. Apparatus according to claim 10 wherein a shut-off valve is interposed between said inlet port structure and said feeding and powering means, and means coupled to said frame and valve and responsive to central conduit deflection for selectively shutting off said valve in response to the presence of a predetermined, excessive deflection of said central conduit.

12. Apparatus according to claim 10 wherein said frame includes an auxiliary internal-combustion engine mounted thereon, and hydraulic means coupled to and powered by said engine for revolvably powering said central conduit.

* * * * *